United States Patent

[11] 3,628,136

[72] Inventor Robert P. Jonas
Phoenix, Ariz.
[21] Appl. No. 855,474
[22] Filed Sept. 5, 1969
[45] Patented Dec. 14, 1971
[73] Assignee The Garrett Corporation
Los Angeles, Calif.

[54] MEANS FOR MEASURING CLEARANCES IN A GAS TURBINE INCLUDING A COAXIAL CABLE CAPACITOR
11 Claims, 4 Drawing Figs.

[52] U.S. Cl. .................................................. 324/61
[51] Int. Cl. .................................................. G01r 27/26
[50] Field of Search .......................................... 324/61;
317/246

[56] References Cited
UNITED STATES PATENTS

| | | | |
|---|---|---|---|
| 2,471,009 | 5/1949 | Reason.......................... | 324/61 UX |
| 2,802,178 | 8/1957 | Shafer et al..................... | 324/61 |
| 2,842,738 | 7/1958 | Warnick......................... | 324/61 |
| 3,030,578 | 4/1962 | Lessman........................ | 324/61 |
| 3,226,615 | 12/1965 | Nagel............................ | 317/246 |

OTHER REFERENCES

Bachel, V. J. Mebverfahren zum Bestimmen der Innemabe von Hohlleitern. In Frequency, Vol. 14, No. 4, 1960, pp. 131–134 (Copy in Group 250, class 324–61.)

Schwirzer, German Printed Application, No. 1081677, Pub. May 12, 1960 (1 sht. dwg. 22 pp. spec.)

Shiver, R.A. Capacitance Probe. in Electronics, May, 1969, pp. 42, 43 81 and 82, TK 7800 E58

*Primary Examiner*—Edward E. Kubasiewicz
*Attorneys*—John N. Hazelwood, Herschel C. Omohundro, Albert J. Miller and Orville R. Seidner ABSTRACT: This apparatus for measuring rapidly changing clearances between relatively movable machine parts in high-temperature regions has a variable capacitor, formed by a stationary electrode and a certain part of the machine movable relative thereto, connected in a circuit having a relatively fixed capacitor provided by a coaxial cable the center conductor of which constitutes a lead to the electrode, a source of high-frequency excitation voltage, a voltage divider, a transistor, a load resistor, and suitable means for translating variations in capacitance of the variable capacitor due to relative movement of the machine parts into indications of measurement of the spacing between the machine parts.

Patented Dec. 14, 1971
3,628,136
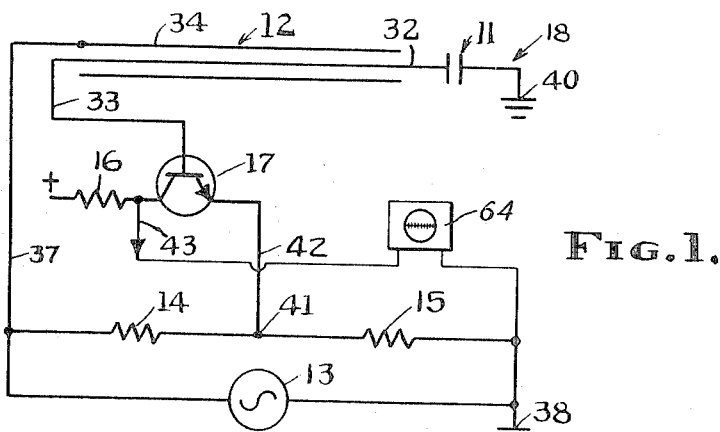
FIG.1.
FIG.2.
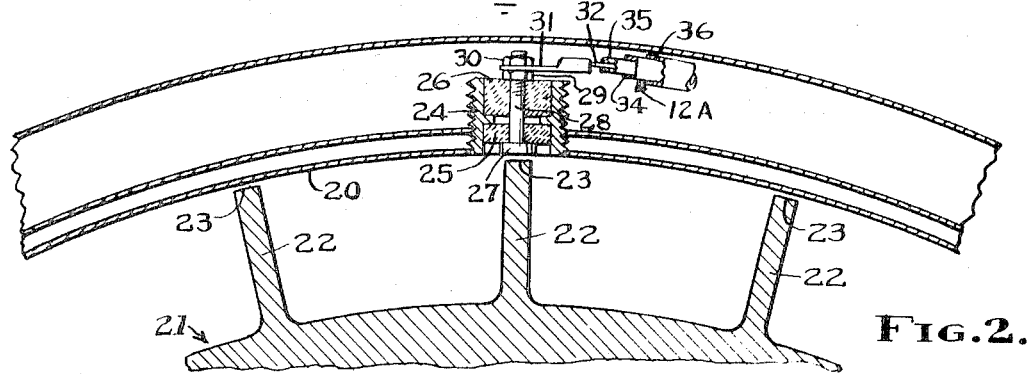
FIG.3.
FIG.4.
INVENTOR.
ROBERT P. JONAS
Herschel C. Omohundro
ATTORNEY

MEANS FOR MEASURING CLEARANCES IN A GAS TURBINE INCLUDING A COAXIAL CABLE CAPACITOR

SUMMARY OF THE INVENTION

This invention relates generally to measuring apparatus and is more particularly directed to apparatus for measuring clearances between relatively movable parts of machines, such as gas turbine engines, in which extremely high temperatures prevail and the parts are closely confined as well as relatively inaccessible. Some of the problems encountered in determining clearance between adjacent parts in a gas turbine engine are (1) that some of the parts deflect due to temperature change and other forces and the degree of deflection cannot be observed, and (2) the high temperatures obtaining within the turbine tend to destroy or render the measuring apparatus inaccurate or inoperative. Heretofore, the amount of clearance between turbine parts, such as rotor blades and shrouds, during operation was not known and could only be approximated. While methods of approximating might approach the actual clearance, an error of only a few thousandths of an inch could be as much as 100 percent error since the clearance between the rotating blades and the shroud must be made as small as possible to prevent blowby and consequent waste of energy in the hot gases.

It has been discovered that relatively accurate measurements of clearance between rotating turbine wheel blades and stationary casings or shrouds can be made by providing one of the parts, preferably the stationary one, with an electrode which cooperates with the other part to form a first capacitor, the capacitance of which varies in accordance with the movement and proximity of the other part, the capacitor being connected in a circuit having a voltage source of oscillating voltage and a source of direct voltage, a voltage divider, a transistor, a load resistor or impedance, a second capacitor, with a fixed capacitance, and suitable indicating or recording means which translates the variation in capacitance of the first capacitor into units of measurement.

It is an object of this invention to provide an apparatus for measuring clearances between movable machine elements in accordance with the preceding paragraph which may be incorporated in the hot section of a gas turbine and which will accurately measure very small clearances in regions subject to elevated temperatures, parts of the apparatus, such as leads, being disposed in or extending through close quarters and consequently being of small size.

A further object of this invention is to provide means for measuring rapidly changing clearances between moving parts in small machines where space is at a premium and temperatures are such that conventional sensors and leads will be quickly destroyed or otherwise rendered inoperative.

These and other objects, features and advantages will become more apparent from the following description of a preferred embodiment of the invention shown in the accompanying drawing.

BRIEF DESCRIPTION OF THE DRAWING

FIG. 1 is a portion of a circuit embodying the invention;

FIG. 2 is a sectional view on an enlarged scale showing a portion of a gas turbine wheel and shroud with the probe of the clearance-measuring apparatus forming the invention incorporated therein;

FIG. 3 is a schematic of the preferred detailed circuit for measuring capacitance; and FIG. 4 represents a portion of an oscilloscope screen on which a trace of signals from the variable capacitor is shown.

DESCRIPTION OF THE PREFERRED EMBODIMENTS

Particular reference to FIG. 1 of the drawings will shown that the first form of clearance-measuring means illustrated includes a variable capacitor, designated generally by the numeral 11, a fixed capacitor generally indicated by the numeral 12, an excitation oscillator 13 for pulsating voltage at high frequency, resistors 14 and 15 connected to form a divider, a load resistor 16, a transistor 17, and connecting lines to complete a circuit 18.

The variable capacitor 11 is shown in detail and as installed in a turbine in FIG. 2. This element 11 includes a probe stationarily mounted in the casing or shroud 20 of a turbine wheel 21 having spaced radiating blades 22 the outer edges 23 of which are disposed in closely spaced relation to the shroud 20. The probe has a threaded sleeve 24 with an internal rib which spaces inner and outer ceramic insulating bushings 25 and 26, respectively, these members receiving a headed electrode 27. The shank 28 of the electrode is threaded to receive a nut 29 employed to lock the electrode and bushings in assembled relationship. A second nut 30 is threaded on the bolt to retain a terminal clip 31 thereon. It will be noted from FIG. 2 that the head of electrode 27 is positioned in predetermined spaced relation to the path traversed by outer edges 23 of the blades 22 as the wheel 21 revolves. This arrangement of electrode and proximate blade forms the variable capacitor 11.

The fixed capacitor 12 in the form of the invention selected for illustration, is composed of a section of coaxial cable 12A having the center conductor 32 thereof connected at one end by clip 31 to the electrode 27 and at the other end by a line 33 to the base of the transistor 17. Center conductor 32 of the coaxial cable is electrically insulated from the surrounding metallic shield 34 by a magnesium oxide electrical insulator body 35 which is capable of withstanding the high temperatures of the regions in the turbine through which the cable extends.

The coaxial cable 12A can be of a sufficiently small size to pass through the restricted spaces of small gas turbine engines, (operative devices with coaxial cables one-sixteenths of an inch in outside diameters have performed satisfactorily) and it can be conveniently obtained composed of materials which will be relatively unaffected by high temperatures encountered in gas turbine engine operation. The metallic shield 34 of the cable 12A is electrically insulated from the machine casing and other parts by a suitable insulative covering 36. Insulators 25, 26 and 36 may be made of alumina or other suitable heat-resistant electrical insulating material.

The other components of the circuit 18 shown in FIG. 1, i.e., the oscillator 13, resistors 14, 15, 16, and transistor 17, are commercially available elements which are connected with the above-described variable and fixed capacitors in unique circuit arrangement to perform the desired function of generating a signal pulse each time a blade passes the electrode 27, the amplitude of each pulse bearing a relation to the clearance between the electrode and the respective blade in their closest relative positions.

As shown in FIG. 1, the shield 34 of the coaxial cable is connected by line 37 with one terminal of oscillator 13. The other terminal of this member is grounded to the frame or casing of the turbine engine, as at 38, and thus is connected with blades 22 of the turbine wheel which are also obviously electrically connected or grounded, as at 40, to the engine frame or casing. The divider formed by resistors 14 and 15 connected in series is connected across the oscillator and the junction 41 between the resistors is connected by line 42 with the emitter of the transistor 17. The collector of the latter element is connected through a load resistor 16 with a suitable direct voltage power source. A lead 43 from the connection line between the load resistor 16 and the transistor may be connected with desired indicating or recording apparatus through substantially conventional rectifying, filtering, amplifying, and demodulating equipment.

When the turbine wheel revolves, movement of the tips of blades 22 past electrode 27 changes the capacitance of capacitor 11. During the operation of the circuit, the excitation voltage from the oscillator 13 is applied to the shield 34 of the coaxial cable 12A. In this particular circuit, the coupling to the probe or electrode is primarily via the capacitance of the shield to the center conductor. Coupling within the transistor and by stray circuit capacitances causes a residual output at oscillator frequency to appear across the load resistor 16. Since the emitter of the transistor is connected to the divider composed of resistors 14 and 15, proper choice of the value of these elements affords a partial cancellation of the residual output voltage which will now depend quite linearly upon the value of the variable capacitor 11. The output voltage becomes higher with larger capacitance of element 11. As the circuit detects small changes in capacitance of element 11, the values of resistors 14 and 15 are chosen to provide a ratio slightly in excess of the capacitance ratio of the coaxial cable and capacitor 11 so that for all changes in value of capacitor 11 a significant imbalance in voltage is always present between the divider connection 41 and the conductor 32. This feature makes all of the indications of increased capacitance of variable capacitor 11 extend in a positive polarity. It allows the use of a simple detector (shown in FIG. 3 and described hereinafter) which is not sensitive to the time phase of the signal at the collector of transistor 17.

The circuit shown in FIG. 3, includes the capacitance-measuring circuit 18 of FIG. 1, slightly modified, and rectifying, filtering, amplifying, and demodulating equipment which may be employed to condition the signals generated in circuit 18 for use in providing measurement indications or recordings. Elements common to both FIG. 1 and FIG. 3 are designated in the latter figure by the same reference numerals used in the former view. Oscillator 13 in the modified circuit may be, for example, a 5-megacycle, crystal type, the alternating signals of which are amplified by a standard circuit including two transistors 44 and 45 and a resonant circuit 46. Transistor 44 is of the PNP type, while transistor 45 is of the NPN type.

The amplified oscillator output is fed by a lead 37A to the shield 34 of the coaxial cable. The other side of the oscillator is connected through ground, as at 38, 40, to the blades 22 of the turbine wheel which constitute the movable part of the variable capacitor 11. The inner conductor 32 of the coaxial cable is connected, at one end to the electrode 27 forming the stationary part of the variable capacitor, and at the other end to the base of transistor 17 through a capacitor 47, which isolates the base of transistor 17 from changes in its biasing voltage due to any abnormal voltage on conductor 32 in the event it should accidentally contact ground or the shield 34. (The capacitor 47 is provided merely as a safety measure; it is not required to make the circuit operable.) Resistor 14 is connected to line 37A through another isolation capacitor 48 while one end of resistor 15 is grounded through line 50. In this circuit the base of transistor 17 is biased to the required voltage value by a voltage divider formed by resistors 51 and 52. The collector of transistor 17 is connected to a positive terminal 53 through an impedance 54, preferably in the form of an induction coil, the function of which is to supply bias from the power supply to the collector of transistor 17, while shunting a minimum of alternating current to the supply.

The amplified modulated carrier voltage is fed by lead 55 through a capacitor 56 to diode rectifier 57 constituting the simple detector previously mentioned. The carrier frequency is removed by a standard filter circuit 58 and the remaining signal, related to capacitance, amplified by transistor 59 to produce in a standard manner on the output lead 43 a voltage that is inversely related to the distance between the electrode 27 and the nearest blade 22. Thus, whenever any one of the blades 22 passes under the electrode 27, the voltage on output lead 43 is a maximum, and whenever two adjacent blades straddle and are equally spaced from the electrode 27, the voltage on lead 43 is a minimum. A suitable transducer 64, such as an oscilloscope, may be connected with the lead 43 to show the changes in voltage and consequently the variations in spacing between the edges of the turbine blades and the electrode. If desired, a recording oscillograph may also be connected in the circuit to produce a permanent record of the measurements.

The frequency in cycles per second of this modulating voltage is equal to the revolutions per second of the spool times the number of blades on the spool. In addition, if any blade is longer than the adjacent blades and consequently passes closer to the electrode, the voltage on lead 43 will be greater when such blade passes closer than when the other blades pass. This condition is illustrated in FIG. 4 wherein a portion of an oscilloscope screen is represented at 60 and a trace 61 produced by the variable voltage is shown thereon. In this display the instantaneous height of the trace is proportional to the capacitance of the electrode to its surroundings. Each blade of the turbine wheel causes a "spike" on the oscilloscope trace 61 as it passes the electrode and the height of a selected spike indicated the clearance between the edge of the respective blade and the electrode. In a demonstration of the invention, two blades were made longer than the adjacent blades to better illustrate the function of the apparatus. In trace 61, two spikes designated by numerals 62 and 63 represent the longer blades. It should be obvious that shorter blades would produce shorter spikes. It should also be clear that the screen of the oscilloscope could be calibrated to indicate the distance or clearance between the edges of the blades and the electrode, if so desired. Thus, for any installation the apparatus can be readily calibrated so that the voltage value is readily converted to distance.

In the light of the above teachings, various modifications and variations of the present invention are contemplated and will be apparent to those skilled in the art without departing from the spirit and scope of the invention. Therefore, the invention is not limited to the exemplary apparatus or procedure described, but includes all embodiments within the scope of the claims.

What is claimed is:

1. Means for measuring operating clearance between two spaced relatively movable elements in a structure, comprising:
    a. a first capacitor having the first of said elements as one plate and an electrode mounted on and insulated from the second element as the other plate;
    b. a second capacitor consisting of a coaxial cable having first and second coextending metallic conductors electrically insulated from one another as the capacitor plates, the first of said conductors being electrically connected at one end with said electrode; and
    c. circuit means having an excitation oscillator with one terminal connected with the second conductor of said second capacitor and the other terminal connected with said one plate of said first capacitor, a voltage divider with a pair of resistors in series connected with the terminals of said oscillator, and means connected with the other end of the first conductor of said second capacitor and the junction between the resistors of said voltage divider for indicating differences in voltage between such points of connection resulting from variations in capacitance in said first capacitor caused by changes in clearance between said movable elements.

2. Means for measuring operating clearance between two spaced elements as defined in claim 1 in which the means for indicating differences in voltage resulting from variations in capacitance in the first capacitor has a transistor with the base thereof connected with the other end of the first conductor of said second capacitor for conditioning signals generated in said circuit.

3. Means for measuring operating clearance between two spaced elements as defined in claim 2 in which the emitter of said transistor is connected to the junction between the resistors of said voltage divider.

4. Means for measuring operating clearance between two spaced elements as defined in claim 1 in which the values of the resistors of said voltage divider provide a ratio in excess of the capacitance ratio of the second capacitor to the first capacitor so that for all changes in value of the first capacitor a significant imbalance in voltage always exists between the junction between said resistors and the inner conductor of said second capacitor.

5. Means for measuring operating clearance between two spaced elements as defined in claim 3 in which a power source is connected through a load resistor with the collector of the transistor.

6. Means for measuring operating clearance between two spaced elements as defined in claim 5 in which a transducer is connected at the juncture of said load resistor and the collector of the transistor.

7. Means for measuring operating clearance between two spaced elements as defined in claim 6 in which the indicating means has rectifying, filtering, amplifying, and demodulating equipment in circuit therewith.

8. Operating clearance measuring means as defined in claim 1 in which the spaced elements of the structure are a turbine wheel and shroud of a gas turbine engine and the metallic conductors of the second capacitor are electrically insulated by a heat-resistant material.

9. Operating clearance measuring means as defined in claim 8 in which the material electrically insulating the metallic conductors of the second capacitor from one another is magnesium oxide.

10. Operating clearance measuring means as defined in claim 8 in which the metallic conductors of the second capacitor are parts of a coaxial cable spaced by a material having heat-resisting and electrical insulating characteristics equal at least to those of magnesium oxide.

11. Operating clearance measuring means as defined in claim 8 in which the turbine wheel constitutes the first of said spaced elements and is electrically connected with the second terminal of the oscillator via the frame of the structure.

* * * * *